(12) United States Patent
Gotoh

(10) Patent No.: US 9,456,139 B2
(45) Date of Patent: Sep. 27, 2016

(54) IMAGING DEVICE, CONTROL METHOD OF THE SAME AND PROGRAM

(71) Applicant: Sony Corporation, Tokyo (JP)

(72) Inventor: Kenji Gotoh, Chiba (JP)

(73) Assignee: Sony Corporation, Tokyo (JP)

( * ) Notice: Subject to any disclaimer, the term of this patent is extended or adjusted under 35 U.S.C. 154(b) by 200 days.

(21) Appl. No.: 13/870,468

(22) Filed: Apr. 25, 2013

(65) Prior Publication Data

US 2013/0321650 A1 Dec. 5, 2013

(30) Foreign Application Priority Data

Jun. 4, 2012 (JP) .................................. 2012-127219

(51) Int. Cl.
*H04N 5/228* (2006.01)
*H04N 5/232* (2006.01)
*G06T 5/00* (2006.01)

(52) U.S. Cl.
CPC ........... *H04N 5/23248* (2013.01); *G06T 5/006* (2013.01)

(58) Field of Classification Search
CPC ....... G06K 9/209; G06T 15/10; G06T 17/10; G06T 2200/08; G06T 7/0018; G06T 7/0022; G06T 7/004; G06T 7/0065; A63F 13/00; A63F 2300/105; B62D 57/032; G01B 7/001; A61B 8/483; A61G 2203/42
USPC .................. 348/207.1, 208.1–208.5, 208.13, 348/208.99
See application file for complete search history.

(56) References Cited

U.S. PATENT DOCUMENTS

| | | | |
|---|---|---|---|
| 2006/0017813 A1 | 1/2006 | Okubo et al. | |
| 2007/0196086 A1* | 8/2007 | Ishikawa | H04N 5/23248 396/55 |
| 2011/0122265 A1* | 5/2011 | Oryoji | H04N 5/23248 348/208.6 |
| 2012/0236266 A1* | 9/2012 | Takahashi | H04N 9/3185 353/69 |

FOREIGN PATENT DOCUMENTS

| | | |
|---|---|---|
| JP | 2004-29640 | 1/2004 |
| JP | 2004-029640 A | 1/2004 |
| JP | 2011-130383 A | 6/2011 |
| JP | 211130383 | 6/2011 |

OTHER PUBLICATIONS

Office Action received for Japanese Patent Application No. 2012-127219, mailed on May 24, 2016, 2 pages.

* cited by examiner

*Primary Examiner* — Trung Diep
(74) *Attorney, Agent, or Firm* — Chip Law Group

(57) ABSTRACT

There is provided an imaging device including a posture change detection part which detects a posture change of an imaging device body, a deflection correction part which corrects deflection of a captured image generated by the posture change, a distortion correction part which corrects distortion of the captured image generated by the posture change, and a control part which makes the deflection be corrected in the deflection correction part based on the posture change detected in the posture change detection part, and makes the distortion be corrected in the distortion correction part based on posture change after limiting processing to the detected posture change.

15 Claims, 12 Drawing Sheets

FIG. 1
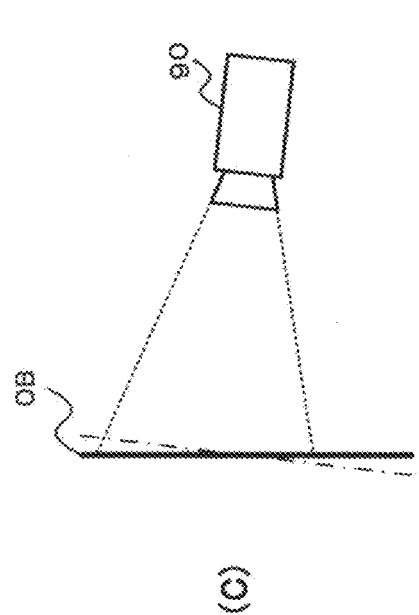
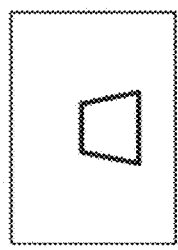
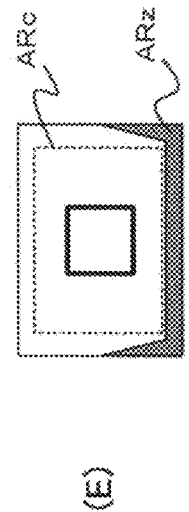
(C) (D) (E)
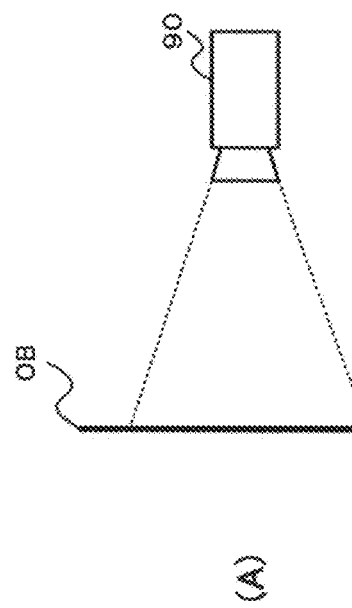
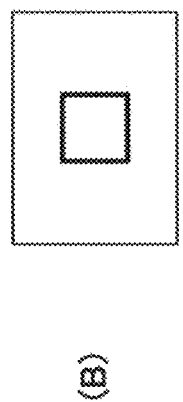
(A) (B)

FIG. 4
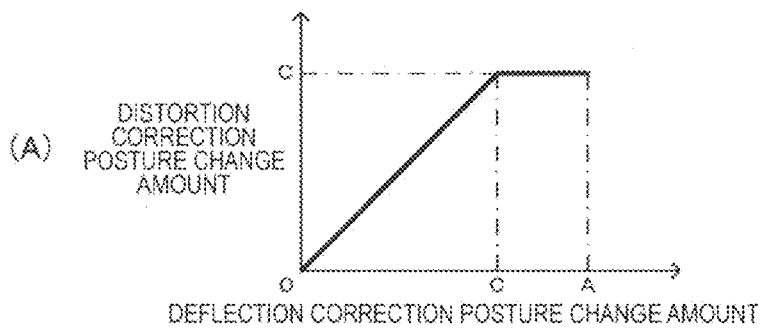
(A)
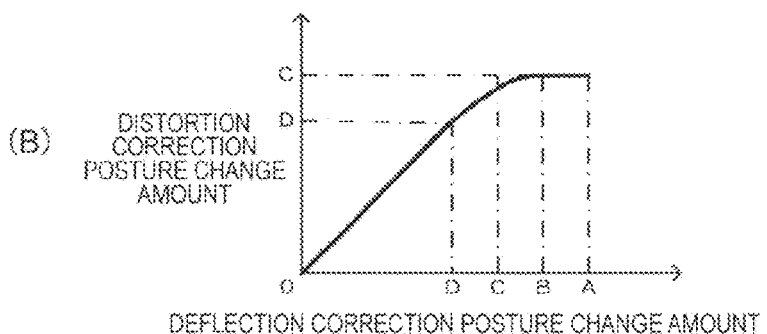
(B)
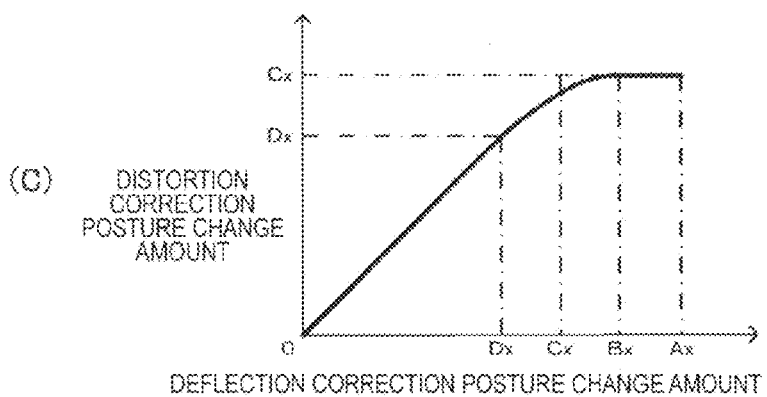
(C)
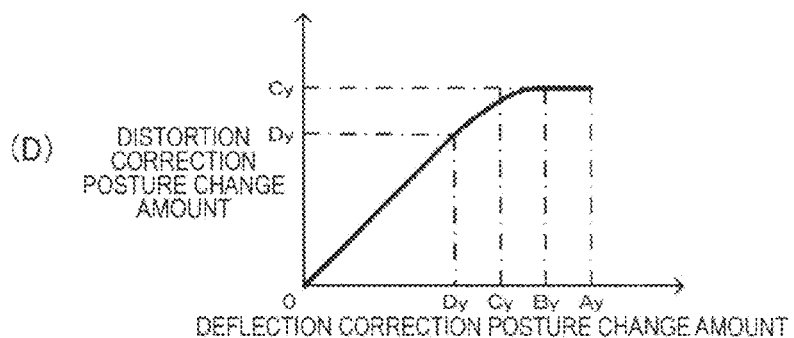
(D)

IMAGING DEVICE, CONTROL METHOD OF THE SAME AND PROGRAM

BACKGROUND

The present technology relates to an imaging device, its control method and a program and is for easily obtaining a deflection corrected image with excellent image quality.

In an imaging device such as a digital camera or a video camera, a position of an optical image formed on an imaging plane of an image sensor is varied by a camera shake or a vibration or the like, causing image deflection of a captured image. In order to correct such image deflection, the imaging device is provided with a deflection correcting optical system such as a shift lens and an electric image deflection correcting function such as an image shift.

Also, since a posture of the imaging device is changed by a handshake or a vibration or the like, an angle of the imaging plane of the image sensor to an object is changed, and image distortion in a trapezoidal shape is generated in the captured image. When the deflection correcting optical system for correcting the image deflection by moving a shift lens according to the posture change of the imaging device is provided, there are cases that a shape of optical system distortion is deformed by movement of the shift lens. Also, when an electronic image deflection correction part for correcting the image deflection by performing processing of image shift or the like using image signals of the captured image is provided, the distorted captured image is shifted. Thus, there are cases that the image distortion is generated by deformation of the shape of the optical system distortion in an image after image deflection correction.

For such distortion, in Japanese Patent Laid-Open No. 2004-29640, a technology of storing a change amount of the distortion and electrically correcting it is proposed.

SUMMARY

When correcting the image distortion in a trapezoidal shape of the captured image generated by the posture change of the imaging device by image processing, a part without an image is generated. In order to make the part without an image invisible in the captured image after distortion correction, it may be needed to extract an image so as not to include the part without an image, and a view angle (a visual field range of the captured image) provided for a user is narrowed.

FIG. 1 is a drawing for describing a deflection corrected image generating operation of the imaging device. For instance, it is assumed that an image of an object OB is captured by an imaging device 90 as indicated in (A) of FIG. 1, and the captured image indicated in (B) of FIG. 1 is obtained. When a posture of the imaging device 90 is changed as indicated in (C) of FIG. 1, the captured image is turned to an image in which the distortion in the trapezoidal shape is generated as indicated in (D) of FIG. 1. When the distortion in the trapezoidal shape is corrected by image processing, the captured image is turned to an image indicated in (E) of FIG. 1 for instance, and an area ARz without an image is generated. Thus, when the image is extracted so as not to include the part without an image, the image in an image extraction area ARc surrounded by a dotted line is extracted, and the view angle provided for a user is narrowed. Since the view angle is narrow, when the image is enlarged and turned to a desired image size and the image is displayed or recorded, the image to be displayed or the image to be recorded is turned to the image with degraded image quality.

Then, in this technology, an imaging device capable of easily obtaining a deflection corrected image with excellent image quality, its control method and a program are provided.

According to an embodiment of the present disclosure, there is provided an imaging device including a posture change detection part which detects a posture change of an imaging device body, a deflection correction part which corrects deflection of a captured image generated by the posture change, a distortion correction part which corrects distortion of the captured image generated by the posture change, and a control part which makes the deflection be corrected in the deflection correction part based on the posture change detected in the posture change detection part, and makes the distortion be corrected in the distortion correction part based on posture change after limiting processing to the detected posture change.

In this technology, the posture change of an imaging device body is detected by a posture change detection part configured using a sensor. In a deflection correction part, deflection is corrected by moving an image extraction area according to the posture change or by moving an imaging element or a deflection correcting optical system according to the posture change. In a distortion correction part, distortion of the captured image generated by the posture change of the imaging device body is corrected. The control part makes the deflection be corrected in the deflection correction part on the basis of the detected posture change, and makes the distortion be corrected in the distortion correction part on the basis of the posture change after limiting processing to the detected posture change. In limitation to the posture change, the posture change is limited to a range up to a predetermined regulated amount. For instance, the limitation is imposed to the maximum change amount of the posture change up to which the captured image of a desired image size for which the deflection correction and the distortion correction are performed does not include an area without an image generated by the distortion correction. Further, in the limitation of the posture change, between a first regulated amount below the predetermined regulated amount and a second regulated amount exceeding the predetermined regulated amount, the posture change is limited to be from the first regulated amount to the predetermined regulated amount. Also, the regulated amount is set individually for the posture change for a longitudinal direction and the posture change for a lateral direction of the captured image to limit the posture change. In the distortion correction for the posture change, for instance the distortion in the trapezoidal shape generated by the posture change and the distortion of the captured image based on an imaging optical system are corrected. When correcting the deflection by driving the deflection correcting optical system, the distortion of the captured image generated by the deflection correcting optical system is corrected.

According to an embodiment of the present disclosure, there is provided a method of controlling an imaging device, the method including detecting a posture change of an imaging device body, correcting deflection of a captured image generated by the posture change, correcting distortion of the captured image generated by the posture change, and making the deflection be corrected based on the detected posture change, and making the distortion be corrected based on the posture change after limiting processing to the detected posture change.

According to an embodiment of the present disclosure, there is provided a program for causing a computer to execute control on an imaging device, the program causing the computer to execute a procedure of correcting the deflection of a captured image generated by a posture change of an imaging device body, a procedure of correcting the distortion of the captured image generated by the posture change of the imaging device body, and a procedure of making the deflection be corrected based on the posture change of the imaging device body detected by a posture change detection part, and making the distortion be corrected based on the posture change after limiting processing to the detected posture change.

Note that the program of the present technology is a program that can be provided using a storage medium and a communication medium that is provided to a general-purpose computer that can execute various program codes in a computer-readable form, for example, a storage medium such as an optical disc, a magnetic disk, a semiconductor memory or a communication medium such as a network. By providing the program in the computer-readable form, a process according to the program is realized on a computer.

According to this technology, the posture change of the imaging device body is detected, and the deflection of the captured image generated by the posture change is corrected on the basis of the detected posture change. Also, on the basis of the posture change after the limiting processing to the detected posture change, the distortion of the captured image generated by the posture change is corrected. Thus, a correction amount of the distortion correction for the posture change is limited, an area without an image, which appears in the image after the distortion correction, can be reduced, and narrowing of the view angle provided for a user can be limited. Since narrowing of the view angle provided for a user, that is, narrowing of the view angle of the finally obtained image, can be limited, image quality degradation due to enlargement of the image is reduced, and the deflection corrected image with the excellent image quality can be easily obtained.

BRIEF DESCRIPTION OF THE DRAWINGS

FIG. 1 is a drawing for describing a deflection corrected image generating operation of the imaging device;

FIG. 4 is a drawing for describing a setting operation of a distortion correction posture change amount;

DETAILED DESCRIPTION OF THE EMBODIMENTS

Figure 2:
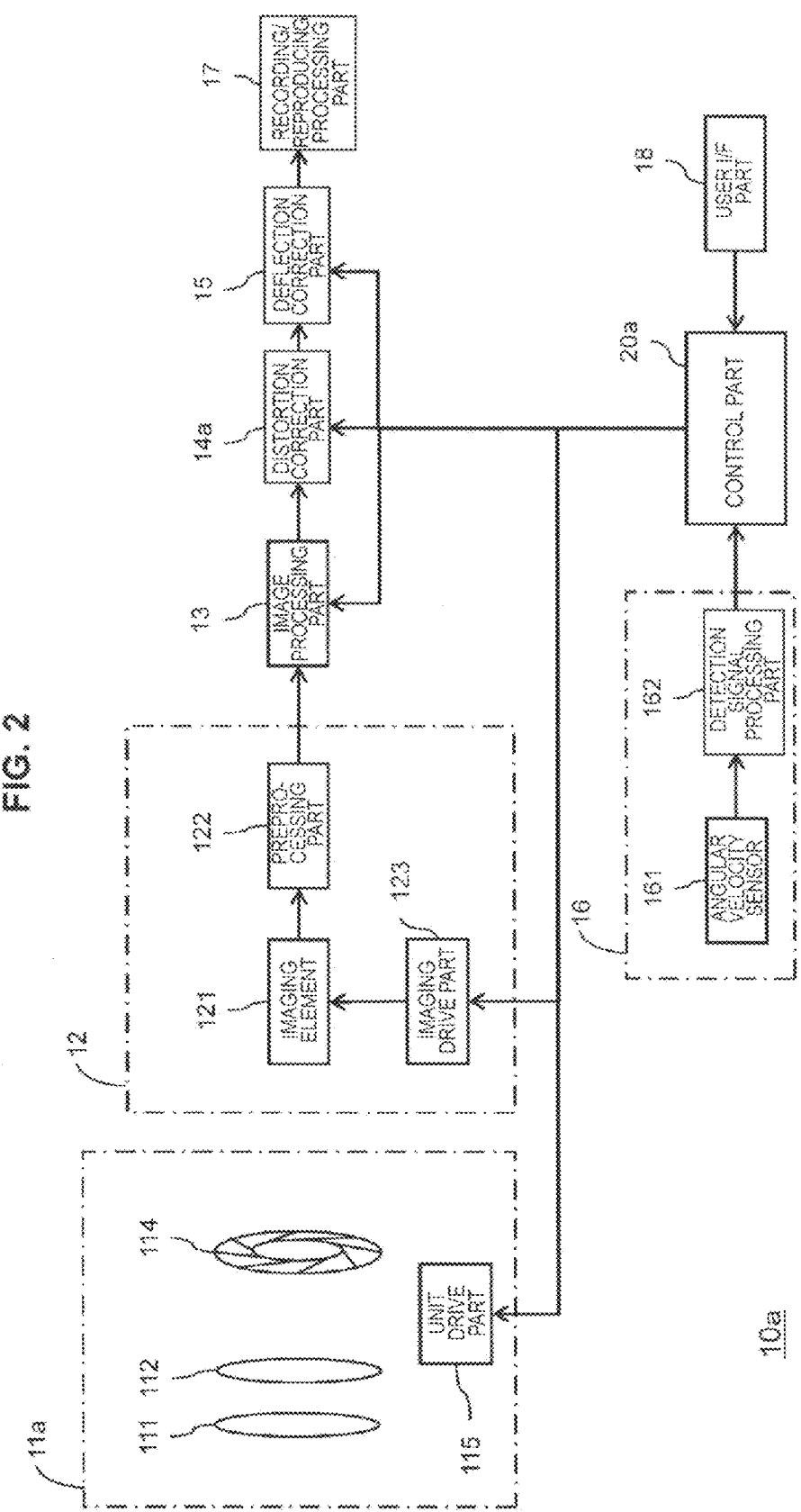
FIG. 2 is a drawing indicating a configuration of an embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, embodiments of the present technology will be described. Description will be made in the following order.

1. First embodiment
1-1. Configuration of the first embodiment
1-2. Operation of the first embodiment
1-2-1. First deflection corrected image generating operation
1-2-2. Second deflection corrected image generating operation
2. Second embodiment
2-1. Configuration of the second embodiment
2-2. Operation of the second embodiment
3. Third embodiment 1. First Embodiment 1-1. Configuration of the First Embodiment FIG. 2 is a drawing indicating the configuration of the first embodiment of the imaging device of this technology. An imaging device 10a includes an imaging optical system 11a, an imaging part 12, an image processing part 13, a distortion correction part 14a, a deflection correction part 15, and a posture change detection part 16. Further, the imaging device 10a includes a recording/reproducing processing part 17, a user interface (user I/F) part 18, and a control part 20a.

The imaging optical system 11a includes a zoom unit 111, a focus unit 112, a diaphragm unit 114, and a unit drive part 115 and the like.

The zoom unit 111 is configured using a zoom lens. The zoom unit 111 moves the zoom lens in an optical axis direction to vary a focus distance. That is, a zoom function is realized. The focus unit 112 is configured using a focus lens. The focus unit 112 moves the focus lens in the optical axis direction to adjust a focus. The diaphragm unit 114 is configured using an iris. The diaphragm unit 114 varies an opening amount of the iris to adjust a light quantity of an object optical image made incident on the imaging part 12. The unit drive part 115 drives the zoom unit 111, the focus unit 112, and the diaphragm unit 114, on the basis of control signals from the control part 20a.

The imaging part 12 includes an imaging element 121, a preprocessing part 122, and an imaging drive part 123 and the like. The imaging element 121 performs photoelectric conversion processing, and converts an optical image formed on an imaging plane by the imaging optical system 11a to electric signals. For the imaging element 121, for instance, a CCD (Charge Coupled Device) image sensor, or a CMOS (Complementary Metal-Oxide Semiconductor) image sensor or the like is used.

The preprocessing part 122 performs noise elimination processing such as CDS (correlated double sampling) to the electric signals generated in the imaging element 121. Also, the preprocessing part 122 performs gain adjustment to turn a signal level of the electric signals to a desired signal level. Further, the preprocessing part 122 performs A/D conversion processing to convert analog image signals that are the electric signals for which the noise elimination processing and the gain adjustment are performed to digital image signals and to output them.

The imaging drive part 123 generates operation pulses or the like that may be needed for driving the imaging element 121, on the basis of the control signals from the control part 20a. For instance, charge read pulses for reading charges, transfer pulses for performing transfer in a vertical direction and a horizontal direction, and shutter pulses for performing an electronic shutter operation and the like are generated.

The image processing part 13 performs camera processing or the like to the digital image signals outputted from the imaging part 12. The image processing part 13 performs nonlinear processing such as gamma correction and knee correction, color correction processing and contour emphasis processing and the like to the image signals for instance.

The distortion correction part 14a performs distortion correction on the basis of the control signals from the control part 20a to the image signals outputted from the image processing part 13. When the posture of the imaging device is changed by a camera shake or a vibration or the like and parallelism of a focus surface of an object and an imaging surface of the imaging element 121 is lost for instance, trapezoidal distortion is generated in the captured image. Also, by optical system distortion of the imaging optical system 11a, the distortion is generated in the captured image. The distortion correction part 14a corrects the distortion of the captured image generated by the posture change of the imaging device and the distortion of the captured image generated by the optical system distortion of the imaging optical system 11a.

The distortion correction part 14a has a distortion correction data table according to the posture change amount of the imaging device for instance beforehand, and selects distortion correction data for a distortion correction posture change amount indicated by the control signals from the control part 20a. By using the distortion correction data, coordinates of respective pixels of the image signals including distortion components are transformed to coordinates after correction, and the image signals of the image from which the distortion is removed or reduced are generated. In such a manner, when the distortion correction data table is used, the distortion can be corrected at a high speed and easily compared to the case of correcting the distortion by performing arithmetic processing.

The deflection correction part 15 performs deflection correction processing using the image signals outputted from the distortion correction part 14a, and generates the image signals of the deflection corrected image. The deflection correction part 15 sets an image extraction area to the image signals outputted from the distortion correction part 14a, on the basis of a deflection correction posture change amount indicated by the control signals from the control part 20a. The deflection correction part 15 extracts the image signals of the set image extraction area, and outputs them as the image signals of the deflection corrected image to the recording/reproducing processing part 17 and an external device. The deflection correction part 15 extracts the image such that the object that stands still even when the posture of the imaging device 10a is changed is at a fixed position on a screen, by moving the image extraction area on the basis of the deflection correction posture change amount.

The posture change detection part 16 detects the posture change in a pitch direction and a yaw direction of the imaging device 10a, and outputs a detection result to the control part 20a. The posture change detection part 16 includes an angular velocity sensor 161 and a detection signal processing part 162 for instance.

The angular velocity sensor 161 generates detection signals according to the deflection in the pitch direction and detection signals according to the posture change in the yaw direction, and outputs them to the detection signal processing part 162. The detection signal processing part 162 performs noise elimination processing, gain adjustment, DC component elimination processing and A/D conversion processing and the like to the detection signals as necessary, and outputs the detection signals after the processing to the control part 20a.

The recording/reproducing processing part 17 records the image signals outputted from the deflection correction part 15 to a recording medium, and also reads the image signals recorded in the recording medium and outputs them to the external device. The recording medium may be detachable like a memory card, an optical disk or a magnetic tape and may be a fixed type such as an HDD or a semiconductor memory module. Also, the recording/reproducing processing part 17 may be provided with an encoder and a decoder to perform compression encoding and expansion decoding of the image signals and record encoded signals in the recording medium.

The user interface part 18 includes an operation switch and an operation button and the like. The user interface part 18 generates operation signals according to a user operation and outputs them to the control part 20a.

The control part 20a includes a CPU (Central Processing Unit), a ROM (Read Only Memory), and a RAM (Random Access Memory) for instance. The CPU reads and executes a control program stored in the ROM if needed. In the ROM, the program to be executed in the CPU as mentioned above and data that may be needed in various kinds of processing and the like are stored beforehand. The RAM is a memory used as a so-called work area for tentatively storing results in progress of the processing or the like. Also, in the ROM or the RAM, information such as various kinds of setting parameters and correction data and the like are stored.

The control part 20a controls the respective parts according to the operation signals from the user interface part 18 and the like and makes the operation according to the user operation be performed in the imaging device 10a. Also, the control part 20a controls a distortion correcting operation performed in the distortion correction part 14a and a deflection correcting operation performed in the deflection correction part 15. The control part 20a sets the deflection correction posture change amount on the basis of the detection signals outputted from the posture change detection part 16 and notifies the deflection correction part 15. For instance, when the angular velocity sensor 161 is used in the posture change detection part 16, the control part 20a calculates the posture change amount (angle) by integrating the detection signals from the posture change detection part 16. Also, since a frequency of the posture change is not high in the posture change during hand-held photographing, it is desirable that the control part 20a perform filter processing for making only frequency components of a camera shake pass through to the detection signals. By performing such filter processing, the control part 20a accurately calculates the posture change amount according to the posture change of the imaging device body. The control part 20a outputs the calculated posture change amount to the deflection correction part 15 as the deflection correction posture change amount. Also, the control part 20a performs the limiting processing in consideration of a difference between the view angles (the visual field range of the captured image) in the horizontal direction and the vertical direction to the calculated posture change amount (equivalent to the deflection correction posture change amount), and outputs the posture change amount after the limiting processing to the distortion correction part 14a as the distortion correction posture change amount.

1-2. Operation of the First Embodiment

Figure 3:
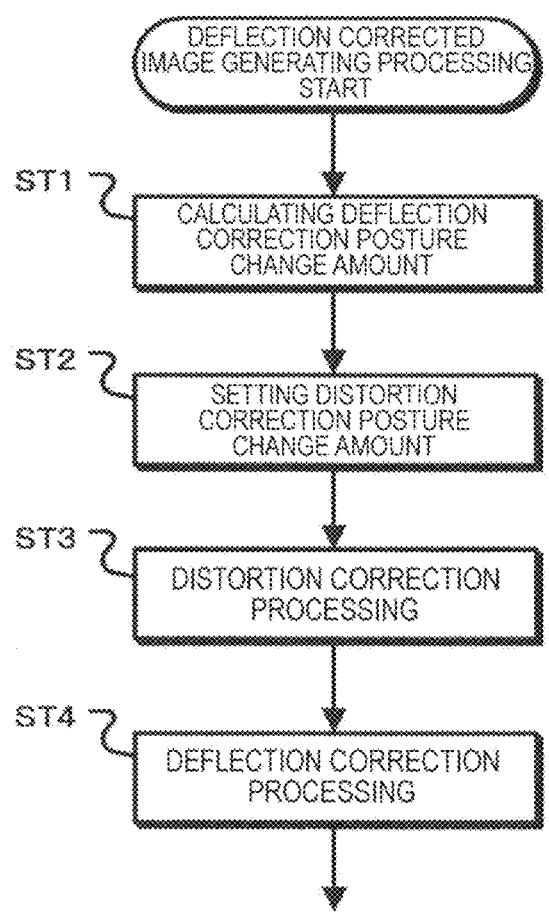
FIG. 3 is a flowchart indicating the deflection corrected image generating operation in an embodiment.

FIG. 3 is a flowchart indicating the deflection corrected image generating operation in the first embodiment. In step ST1, the imaging device 10a calculates the deflection correction posture change amount using output of the posture change detection part 16 and advances to step ST2.

In step ST2, the imaging device 10a sets the distortion correction posture change amount. The imaging device 10a limits the posture change amount so as to suppress narrowing of the view angle when correcting the trapezoidal distortion, sets the posture change amount after the limiting processing as the distortion correction posture change amount, and advances to step ST3. For instance, the imaging device 10a imposes limitation to the deflection correction posture change amount and performs conversion processing of converting it to the distortion correction posture change amount.

In step ST3, the imaging device 10a performs distortion correction processing. The imaging device 10a corrects the distortion of the captured image on the basis of the distortion correction posture change amount, generates a distortion corrected image, and advances to step ST4.

In step ST4, the imaging device 10a performs deflection correction processing. The imaging device 10a extracts an image from the distortion corrected image, controls an image extraction position on the basis of the deflection correction posture change amount, and thus generates the deflection corrected image.

FIG. 4 is a drawing for describing a setting operation of the distortion correction posture change amount, and illustrates the case of converting the deflection correction posture change amount to the distortion correction posture change amount limited to the range up to a predetermined regulated amount.

The imaging device 10a sets the distortion correction posture change amount so as to suppress increase of an area without an image and narrowing of the view angle when the distortion is corrected. For instance, as indicated in (A) of FIG. 4, when the deflection correction posture change amount is within a range from a correction angle 0 to a correction angle C, the distortion correction posture change amount is made equal to the deflection correction posture change amount. Also, when the deflection correction posture change amount exceeds the correction angle C which is the predetermined regulated amount, the distortion correction posture change amount is limited to the correction angle C. In such a manner, since the distortion correction posture change amount is limited to the correction angle C even when the deflection correction posture change amount becomes large, by correcting the distortion on the basis of the distortion correction posture change amount, narrowing of the view angle can be suppressed even when the deflection correction posture change amount becomes large.

It is desirable that the predetermined regulated amount be the maximum change amount of the posture change up to which the captured image of a desired image size for which the deflection correction and the distortion correction are performed does not include an area without an image generated by the distortion correction. When the predetermined regulated amount is set in such a manner, the correctable posture change can be maximized when generating the captured image of the desired image size, for which the deflection correction and the distortion correction are performed.

The deflection correction posture change amount may be converted to the distortion correction posture change amount as indicated in (B) of FIG. 4. That is, when the deflection correction posture change amount is within a range from the correction angle 0 to a correction angle D, the distortion correction posture change amount is made equal to the deflection correction posture change amount. Also, when the deflection correction posture change amount is within a range from the correction angle D to a correction angle B (B satisfies "C<B≤A"), the distortion correction posture change amount is changed from the correction angle D to the correction angle C in the range of the deflection correction posture change amount from the correction angle D to the correction angle B, thereby limiting the value to the range from the correction angle D to the correction angle C. When the deflection correction posture change amount exceeds the correction angle B, the distortion correction posture change amount is limited to the correction angle C. In such a manner, when the deflection correction posture change amount is converted to the distortion correction posture change amount, conversion is smoothly performed. Thus, a correcting operation until the deflection correction posture change amount exceeds the correction angle C and a correcting operation when it exceeds the correction angle C can be prevented from becoming very much different as indicated in (A) of FIG. 4.

Further, when sizes in a longitudinal direction and in a lateral direction of the captured image are different, that is, when the view angles in the horizontal direction and in the vertical direction are different, narrowing of the view angle can be efficiently suppressed when the conversion is performed with different characteristics for the respective directions. For instance, when the view angle is wide in the horizontal direction relative to the vertical direction, for the horizontal direction, the deflection correction posture change amount for the horizontal direction is converted to the distortion correction posture change amount in the horizontal direction with the characteristic indicated in (C) of FIG. 4. Also, for the vertical direction, the deflection correction posture change amount for the vertical direction is converted to the distortion correction posture change amount in the vertical direction with the characteristic indicated in (D) of FIG. 4.

The conversion may be performed with the characteristic indicated in (A) of FIG. 4 for a direction of a narrow view angle and the conversion may be performed with the characteristic indicated in (B) of FIG. 4 for a direction of a wide view angle. For instance, when the view angle in the horizontal direction (X direction) is wider than that in the vertical direction (Y direction), the maximum deflection correction posture change amount (Ym) for the vertical direction is defined as the correction angle C, and the distortion correction posture change amount is limited to the correction angle C (=Ym) with the characteristic indicated in (A) of FIG. 4. Also, for the horizontal direction in which the view angle is wider than that in the vertical direction, the correction is performed with the characteristic indicated in (B) of FIG. 4, the maximum deflection correction posture change amount (Xm) for the horizontal direction is defined as the correction angle A, and the distortion correction posture change amount is limited to the correction angle C (=Ym). In such a manner, for the vertical direction, the distortion is correctable according to the calculated posture change amount (equivalent to the deflection correction posture change amount). When the view angle in the horizontal direction is wider than that in the vertical direction, the distortion can be corrected to the larger deflection correction posture change amount than that for the vertical direction, and the change of the distortion correction can be made smooth relative to the change of the deflection correction posture change amount.

[1-2-1. First Deflection Corrected Image Generating Operation]

Next, the first deflection corrected image generating operation in the first embodiment will be described. In the first deflection corrected image generating operation, the deflection corrected image generating operation when using an ideal lens which does not generate distortion in the captured image will be described.

Figure 5:
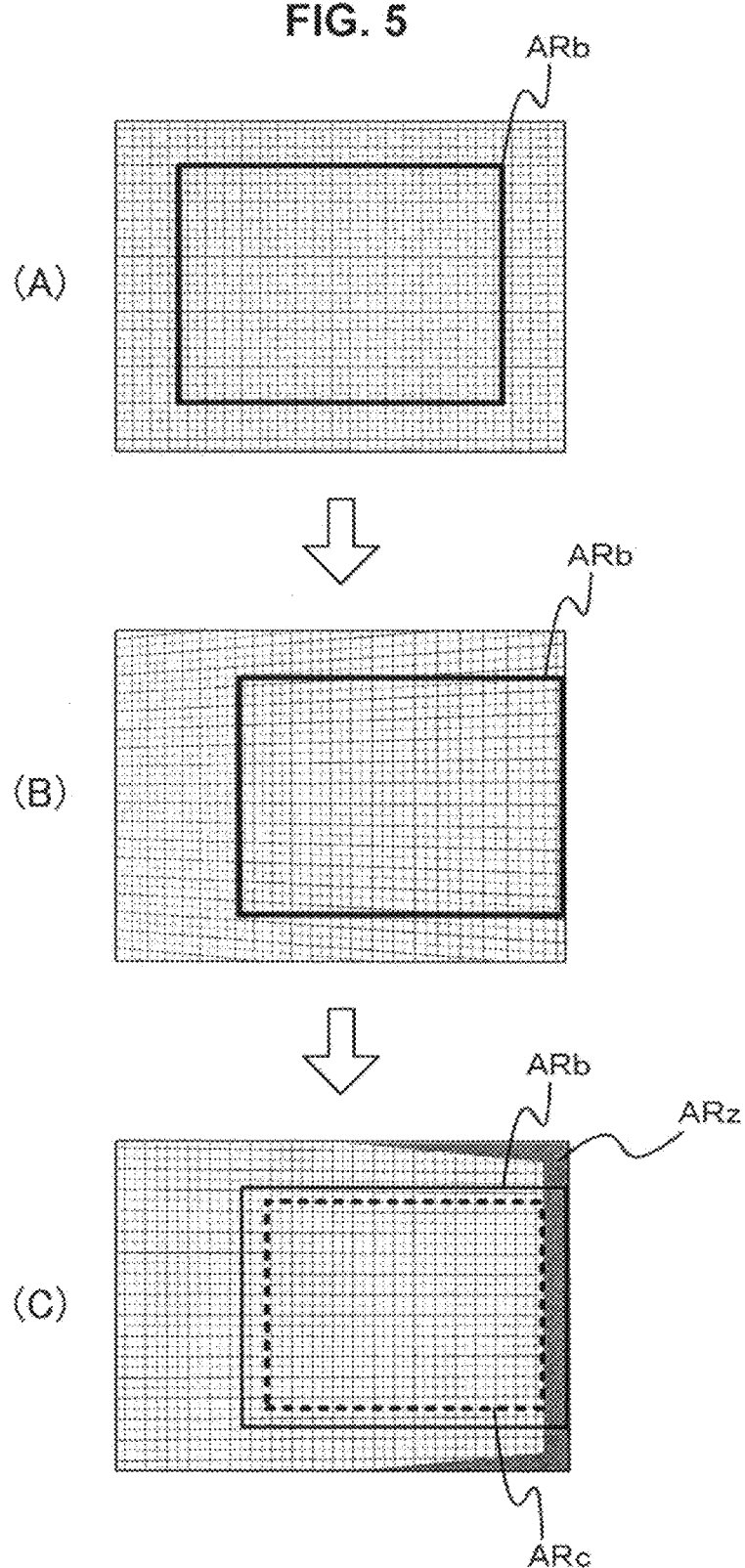
FIG. 5 is a drawing for describing a first deflection corrected image generating operation.

FIG. 5 is a drawing for describing the first deflection corrected image generating operation. An image extraction area ARb from the captured image is illustrated in (A) of FIG. 5. A position of the image extraction area ARb is moved so as to correct the deflection on the basis of the deflection correction posture change amount.

When the deflection in the yaw direction (left direction, for instance) is generated in the imaging device 10a, the trapezoidal distortion is generated in the captured image as indicated in (B) of FIG. 5. Also, by the generation of the deflection in the yaw direction (left direction, for instance), the image extraction area ARb is turned to a position moved in a right direction relative to the position in (A) of FIG. 5. A moving amount is determined according to the deflection correction posture change amount.

When the trapezoidal distortion generated in the captured image is corrected in the distortion correction part 14a of the imaging device 10a, as indicated in (C) of FIG. 5, an area ARz without an effective image is generated. Thus, the deflection correction part 15 reduces the image extraction area so as not to include the area without an effective image with the center of the image extraction area ARb moved according to the deflection correction posture change amount as a reference, and outputs the image signals of a reduced image extraction area ARc as the image signals after the deflection correction.

Also, the distortion correction part 14a corrects the trapezoidal distortion on the basis of the distortion correction posture change amount obtained by performing processing indicated in FIG. 4. Thus, for the captured image after trapezoidal distortion correction, since the distortion correction posture change amount is limited to the predetermined posture change amount even when the deflection correction posture change amount becomes large, spread of the area ARz without an effective image can be limited. Therefore, the image extracted from the deflection correction part 15, that is, the image of the image extraction area ARc, can be prevented from becoming an image with a small view angle.

Figure 6:
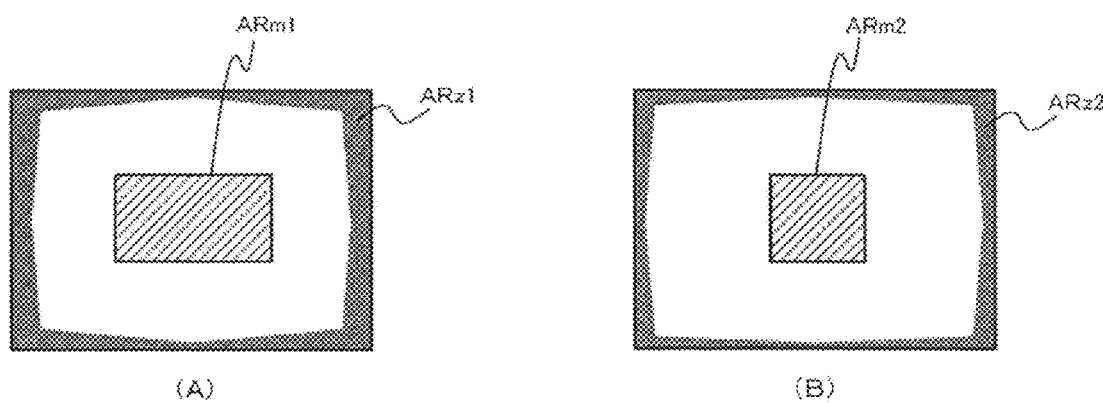
FIG. 6 is a drawing indicating a moving range of an image extraction center position when an image extraction position is determined using the distortion correction posture change amount.

FIG. 6 indicates a moving range of an image extraction center position when determining the image extraction position using the distortion correction posture change amount, the case of not limiting the distortion correction posture change amount is indicated in (A) of FIG. 6, and the case of limiting the distortion correction posture change amount is indicated in (B) of FIG. 6, respectively.

When not limiting the distortion correction posture change amount, the area without an effective image becomes wider as the deflection correction posture change amount becomes larger, and an area ARz1 without an effective image is generated as indicated in (A) of FIG. 6. Also, the moving range of the image extraction center position when determining the image extraction position using the distortion correction posture change amount is a range of an area ARm1 for instance.

When limiting the distortion correction posture change amount, since the distortion correction posture change amount is to be limited when the deflection correction posture change amount becomes large, an area ARz2 without an effective image becomes smaller than the area ARz1 in the case of not limiting the distortion correction posture change amount, as indicated in (B) of FIG. 6. Also, the moving range of the image extraction center position when the image extraction position is determined using the distortion correction posture change amount is the range of an area ARm2 narrower than the area ARm1.

As described above, when generating the deflection corrected image by setting the image extraction area so as not to include the area without an image and extracting the image, reduction of the view angle of the deflection corrected image can be limited by limiting the distortion correction posture change amount. Thus, image quality degradation due to enlargement of the image is reduced and the deflection corrected image with excellent image quality can be easily obtained. Also, when the view angle is fixed and the distortion correction posture change amount is limited, a deflection correction range can be widened compared to the case of not limiting the distortion correction posture change amount. When generating the image signals of the image from which the distortion is removed or reduced by using the distortion correction data table, by limiting the distortion correction posture change amount, the data amount of the distortion correction data table becomes small compared to the case of not imposing the limitation so that a storage capacity of the memory or the like which stores the distortion correction data table can be reduced.

[1-2-2. Second Deflection Corrected Image Generating Operation]

Next, the second deflection corrected image generating operation in the first embodiment will be described. In the second deflection corrected image generating operation, the deflection corrected image generating operation when the optical system distortion of the imaging optical system is generated in the captured image will be described.

Figure 7:
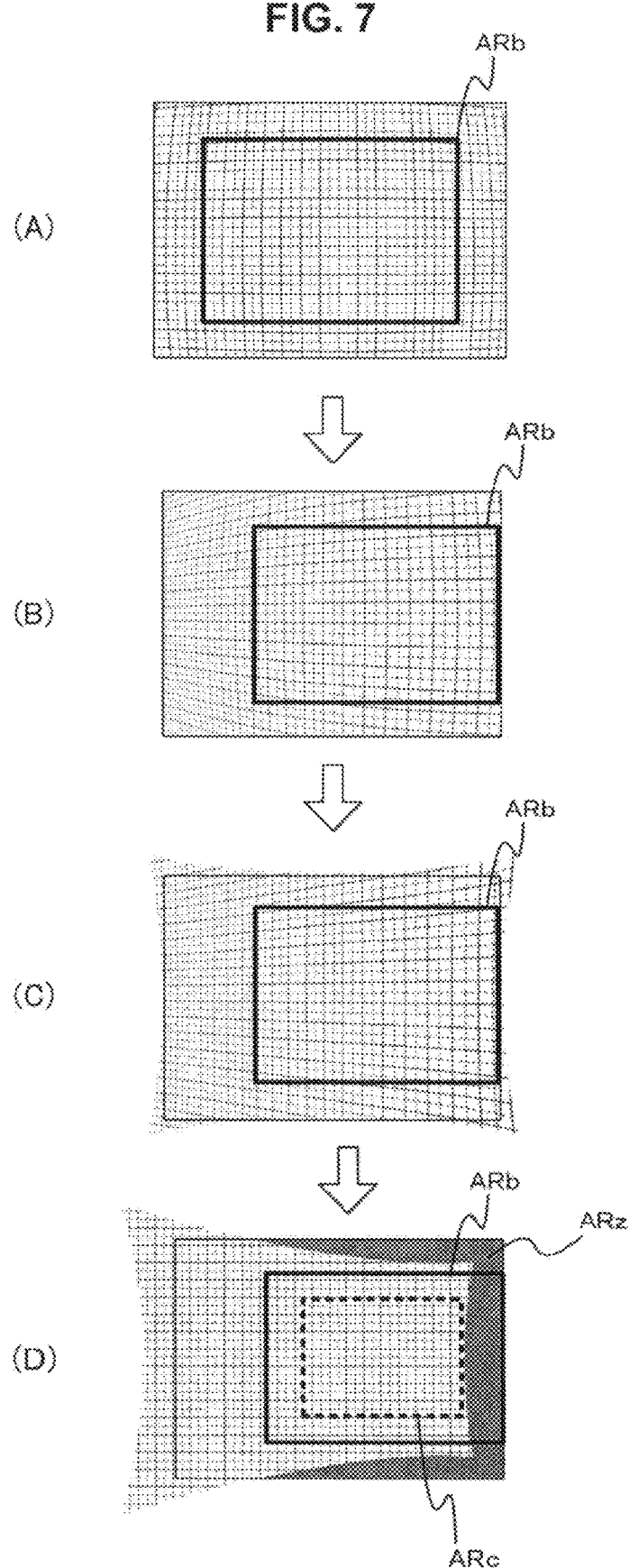
FIG. 7 is a drawing for describing a second deflection corrected image generating operation.

FIG. 7 is a drawing for describing the second deflection corrected image generating operation. The image extraction area ARb from the captured image is illustrated in (A) of FIG. 7. The position of the image extraction area ARb is moved so as to correct the deflection on the basis of the deflection correction posture change amount.

When the deflection in the yaw direction (left direction, for instance) is generated in the imaging device 10a, the trapezoidal distortion is generated in the captured image as indicated in (B) of FIG. 7. Also, by the generation of the deflection in the yaw direction (left direction, for instance), the image extraction area ARb is turned to a position moved in the right direction relative to the position in (A) of FIG. 7. The moving amount is determined according to the deflection correction posture change amount.

The distortion correction part 14a of the imaging device 10a corrects the optical system distortion of the captured image, and generates an optical system distortion corrected image as indicated in (C) of FIG. 7. Further, when the distortion correction part 14a of the imaging device 10a corrects the trapezoidal distortion generated in the optical system distortion corrected image, as indicated in (D) of FIG. 7, the area ARz without an effective image is generated. Thus, the deflection correction part 15 reduces the image extraction area ARb so as not to include the area without an effective image with the center of the image extraction area ARb moved according to the deflection correction posture change amount as a reference, and outputs the image signals of the reduced image extraction area ARc as the image signals after the deflection correction.

Also, the distortion correction part 14a corrects the trapezoidal distortion on the basis of the distortion correction posture change amount obtained by performing the processing indicated in FIG. 4. Thus, for the captured image after the trapezoidal distortion correction, since the distortion correction posture change amount is limited to the predetermined posture change amount even when the deflection correction posture change amount becomes large, the spread of the area ARz without an effective image can be limited. Therefore, the image extracted from the deflection correction part 15, that is, the image of the image extraction area ARc, can be prevented from becoming the image with the small view angle.

As described above, in the second deflection corrected image generating operation as well, when generating the deflection corrected image by setting the image extraction area so as not to include the area without an image and extracting the image, the reduction of the view angle of the deflection corrected image can be limited by limiting the distortion correction posture change amount. Thus, the image quality degradation due to the enlargement of the image is reduced and the deflection corrected image with excellent image quality can be easily obtained. Further, the moving range of the image extraction center position can be widened, and the deflection correction range can be widened compared to the case of not limiting the distortion correction posture change amount. While the trapezoidal distortion is corrected after the optical system distortion is corrected in the description of FIG. 7, the optical system distortion may be corrected after the trapezoidal distortion is corrected. By preparing the correction data table and using the correction data table, the image after the correction indicated in (D) of FIG. 7 may be directly obtained from the captured image indicated in (A) of FIG. 7. When the imaging optical system 11a is exchangeable, the correction data table may be made switchable and the correction may be performed using the correction data table according to optical characteristics of the exchanged imaging optical system 11a.

2. Second Embodiment

In the first embodiment, the case of using so-called electronic deflection correction of correcting the deflection by moving the image extraction position according to the deflection correction posture change amount from the image generated in the imaging part is described. However, the deflection correction is not limited to the electronic deflection correction and optical deflection correction of correcting the deflection by driving a deflection correcting optical system provided in the imaging optical system can be used as well.

2-1. Configuration of the Second Embodiment

Figure 8:
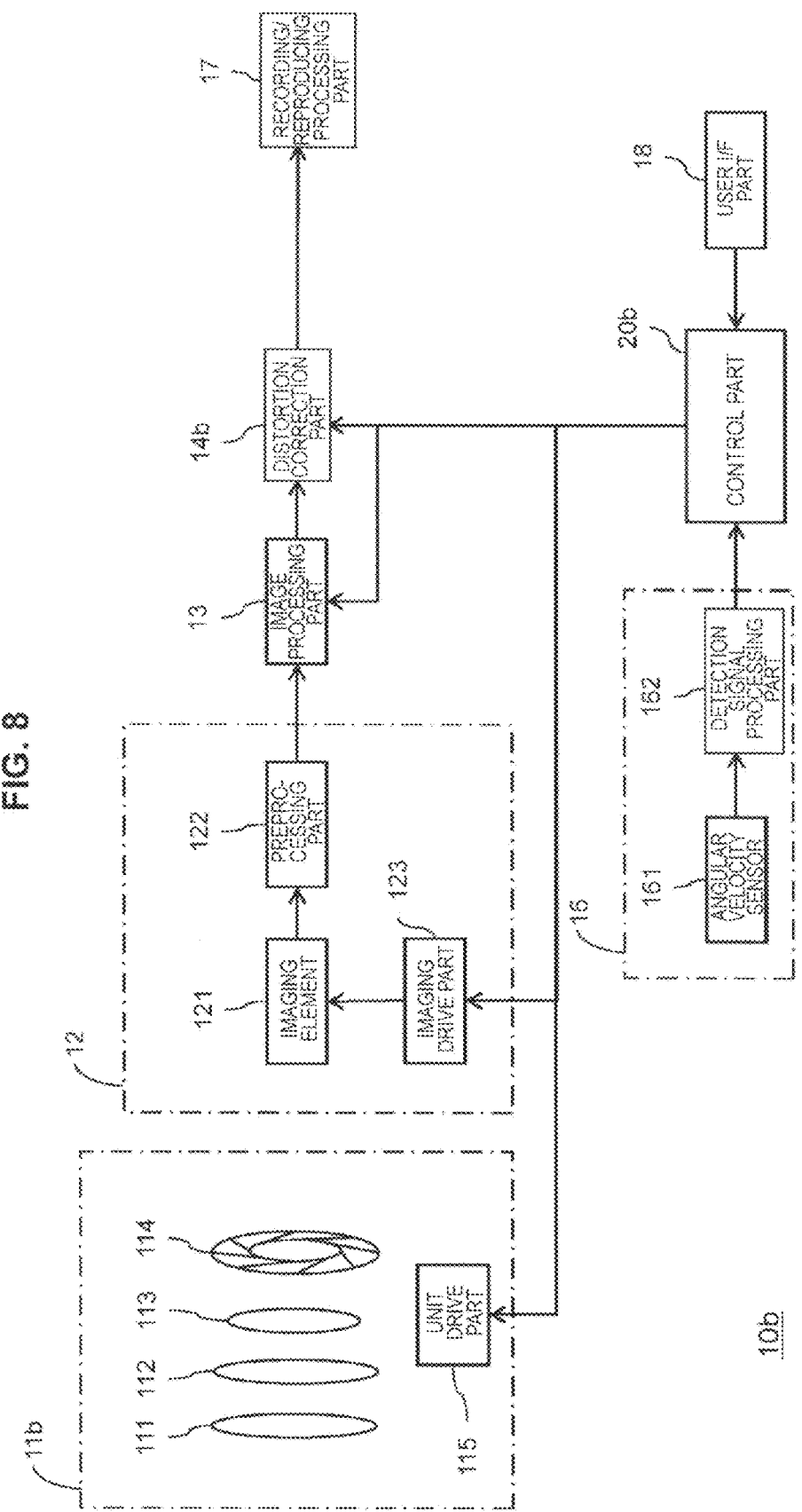
FIG. 8 is a drawing indicating a configuration of an embodiment.

Next, in the second embodiment, the case of using the optical deflection correction will be described. FIG. 8 illustrates the configuration of the second embodiment. An imaging device 10b in the second embodiment includes an imaging optical system 11b, the imaging part 12, the image processing part 13, a distortion correction part 14b, the posture change detection part 16, the recording/reproducing processing part 17, the user interface (user I/F) part 18, and a control part 20b.

The imaging optical system 11b includes the zoom unit 111, the focus unit 112, a deflection correction unit 113 which is the deflection correcting optical system, the diaphragm unit 114, and the unit drive part 115 and the like.

The zoom unit 111 is configured using a zoom lens. The zoom unit 111 moves the zoom lens in the optical axis direction to vary the focus distance. That is, the zoom function is realized. The focus unit 112 is configured using a focus lens. The focus unit 112 moves the focus lens in the optical axis direction to adjust a focus.

The deflection correction unit 113 is configured using a shift lens for instance. The deflection correction unit 113 moves the shift lens in a direction vertical to an optical axis to shift the optical axis, and cancels image deflection. The deflection correction unit 113 is not limited to the shift lens as long as it is capable of optically correcting the deflection, and can be the deflection correcting optical system capable of freely controlling a prism angle for instance.

The diaphragm unit 114 is configured using an iris. The diaphragm unit 114 varies the opening amount of the iris to adjust the light quantity of the object optical image made incident on the imaging part 12. The unit drive part 115 drives the zoom unit 111, the focus unit 112, the deflection correction unit 113, and the diaphragm unit 114, on the basis of the control signals from the control part 20a. Also, the unit drive part 115 drives the deflection correction unit 113 according to the deflection correction posture change amount indicated by the control signals from the control part 20b, and performs the deflection correcting operation of the captured image.

The imaging part 12 includes the imaging element 121, the preprocessing part 122, and the imaging drive part 123 and the like. The imaging element 121 performs the photoelectric conversion processing, and converts the optical image formed on the imaging plane by the imaging optical system 11b to the electric signals. For the imaging element 121, for instance, a CCD (Charge Coupled Device) image sensor, or a CMOS (Complementary Metal-Oxide Semiconductor) image sensor or the like is used.

The preprocessing part 122 performs the noise elimination processing such as CDS (correlated double sampling) to the electric signals generated in the imaging element 121. Also, the preprocessing part 122 performs the gain adjustment to turn the signal level of the electric signals to the desired signal level. Further, the preprocessing part 122 performs the A/D conversion processing to convert the analog image signals that are the electric signals for which the noise elimination processing and the gain adjustment are performed to the digital image signals and to output them.

The imaging drive part 123 generates the operation pulses or the like that may be needed for driving the imaging element 121, on the basis of the control signals from the control part 20b. For instance, charge read pulses for reading charges, transfer pulses for performing transfer in the vertical direction and the horizontal direction, and shutter pulses for performing an electronic shutter operation and the like are generated.

The image processing part 13 performs the camera processing or the like to the digital image signals outputted from the imaging part 12. The image processing part 13 performs the nonlinear processing such as the gamma correction and the knee correction, the color correction processing and the contour emphasis processing and the like to the image signals for instance.

The distortion correction part 14b performs the distortion correction on the basis of the control signals from the control part 20b to the image signals outputted from the image processing part 13. In the captured image, the distortion of the image is generated by the optical system distortion of the imaging optical system 11b. When the posture of the imaging device is changed by a camera shake or a vibration or the like and the deflection correction unit 113 is driven according to the deflection, the optical system distortion is changed according to the position of the shift lens of the deflection correction unit 113 for instance. Further, there are cases that the trapezoidal distortion is generated in the captured image when the posture of the imaging device is changed by a camera shake or a vibration or the like and the parallelism of a focus surface of an object and an imaging surface of the imaging element 121 is lost for instance. The distortion correction part 14b corrects the distortion of the image generated by the optical system distortion of the imaging optical system 11b, the distortion of the image based on the change of the optical system distortion generated according to the posture change of the imaging device, and the distortion of the image accompanying the posture change of the imaging device, and the like. Further, the distortion correction part 14b extracts the image signals of the image extraction area from the image for which the distortion correction is performed, and turns them to the image signals of the deflection corrected image. The image extraction area is a range in which the image is present in the image signals after the distortion correction.

The distortion correction part 14b has the distortion correction data tables according to the posture change amount of the imaging device, the optical system distortion of the imaging optical system 11b and the change of the optical system distortion for instance beforehand. The distortion correction part 14b selects the distortion correction data table according to the optical system distortion of the imaging optical system 11b and the change of the optical system distortion on the basis of the control signals from the control part 20b. Further, the distortion correction part 14b selects the distortion correction data for the distortion correction posture change amount indicated by the control signals from the control part 20b, on the basis of the selected distortion correction data table. By using the distortion correction data, the coordinates of the respective pixels of the image signals including the distortion components are transformed to the coordinates after the correction, and the image signals of the image from which the distortion is removed or reduced are generated. In such a manner, when the distortion correction data table is used, the distortion can be corrected at a high speed and easily compared to the case of correcting the distortion by performing arithmetic processing.

The posture change detection part 16 detects the posture change in the pitch direction and the yaw direction, and outputs the detection result to the control part 20b. The posture change detection part 16 includes the angular velocity sensor 161 and the detection signal processing part 162 for instance.

The angular velocity sensor 161 generates the detection signals according to the deflection in the pitch direction of the imaging device 10b and the detection signals according to the posture change in the yaw direction, and outputs them to the detection signal processing part 162. The detection signal processing part 162 performs the noise elimination processing, the gain adjustment, the DC component elimination processing and the A/D conversion processing and the like to the detection signals, and outputs the detection signals after the processing to the control part 20b.

The recording/reproducing processing part 17 records the image signals outputted from the distortion correction part 14b to a recording medium, and also reads the image signals recorded in the recording medium and outputs them to the external device. The recording medium may be detachable like a memory card, an optical disk or a magnetic tape and may be a fixed type such as an HDD or a semiconductor memory module. Also, the recording/reproducing processing part 17 may be provided with an encoder and a decoder to perform compression encoding and expansion decoding of the image signals and record encoded signals in the recording medium.

The user interface part 18 includes the operation switch and the operation button and the like. The user interface part 18 generates the operation signals according to the user operation and outputs them to the control part 20b.

The control part 20b includes the CPU (Central Processing Unit), the ROM (Read Only Memory), and the RAM (Random Access Memory) for instance. The CPU reads and executes the control program stored in the ROM if needed. In the ROM, the program to be executed in the CPU as mentioned above and the data that may be needed in various kinds of processing and the like are stored beforehand. The RAM is a memory used as a so-called work area for tentatively storing the results in progress of the processing or the like. Also, in the ROM or the RAM, the information such as various kinds of setting parameters and the correction data and the like are stored.

The control part 20b controls the respective parts according to the operation signals from the user interface part 18 and the like and makes the operation according to the user operation be performed in the imaging device 10b. Also, the control part 20b controls the distortion correcting operation performed in the distortion correction part 14b and the deflection correcting operation performed in the deflection correction unit 113. The control part 20b sets the deflection correction posture change amount on the basis of the detection signals outputted from the posture change detection part 16 and notifies the unit drive part 115. For instance, when the angular velocity sensor 161 is used in the posture change detection part 16, the control part 20b calculates the posture change amount (angle) by integrating the detection signals from the posture change detection part 16. Also, since the frequency of the posture change is not high in the posture change during hand-held photographing, the control part 20b performs the filter processing for making only the frequency components of a camera shake pass through to the detection signals. By performing such filter processing, the control part 20b accurately calculates the posture change amount according to the posture change of the imaging device body. The control part 20b outputs the calculated posture change amount to the unit drive part 115 as the deflection correction posture change amount. Also, the control part 20b performs the limiting processing in consideration of the difference between the view angles (the visual field range of the captured image) in the horizontal direction and the vertical direction to the calculated posture change amount (equivalent to the deflection correction posture change amount), and outputs the posture change amount after the limiting processing to the distortion correction part 14*b* as the distortion correction posture change amount.

2-2. Operation of the Second Embodiment

Figure 9:
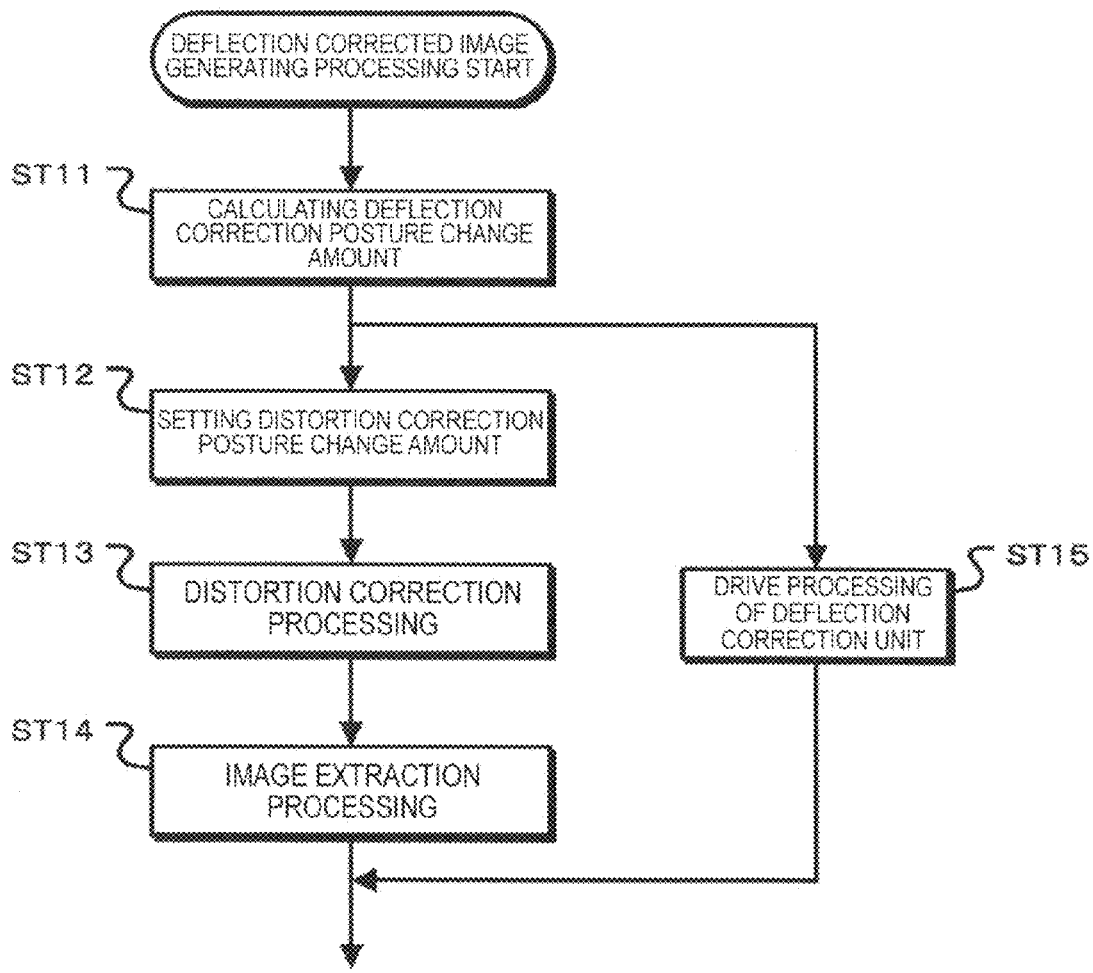
FIG. 9 is a flowchart indicating a deflection corrected image generating operation in an embodiment.

FIG. 9 is a flowchart indicating the deflection corrected image generating operation in the second embodiment. In step ST11, the imaging device 10*b* calculates the deflection correction posture change amount using the output of the posture change detection part 16 and advances to step ST12 and 15.

In step ST12, the imaging device 10*b* sets the distortion correction posture change amount. The imaging device 10*b* limits the posture change amount so as to suppress narrowing of the view angle when correcting the distortion, sets the posture change amount after the limiting processing as the distortion correction posture change amount, and advances to step ST13. For instance, the imaging device 10*b* imposes limitation to the deflection correction posture change amount and performs the conversion processing of converting it to the distortion correction posture change amount.

In step ST13, the imaging device 10*b* performs the distortion correction processing. The imaging device 10*b* corrects the distortion of the captured image on the basis of the distortion correction posture change amount, generates the distortion corrected image, and advances to step ST14.

In step ST14, the imaging device 10*b* performs image extraction processing. The imaging device 10*b* performs the image extraction processing from the distortion corrected image so as not to include the area without an image generated by the distortion correction processing. In the second embodiment, since the deflection is corrected by the deflection correction unit 113, the image is extracted with the center position of the captured image as a reference. The imaging device 10*b* defines the extracted image as the deflection corrected image.

In step ST15, the imaging device 10*b* performs drive processing of the deflection correction unit. The imaging device 10*b* corrects the deflection by driving the shift lens of the deflection correction unit 113, on the basis of the deflection correction posture change amount calculated in step ST11.

Figure 10:
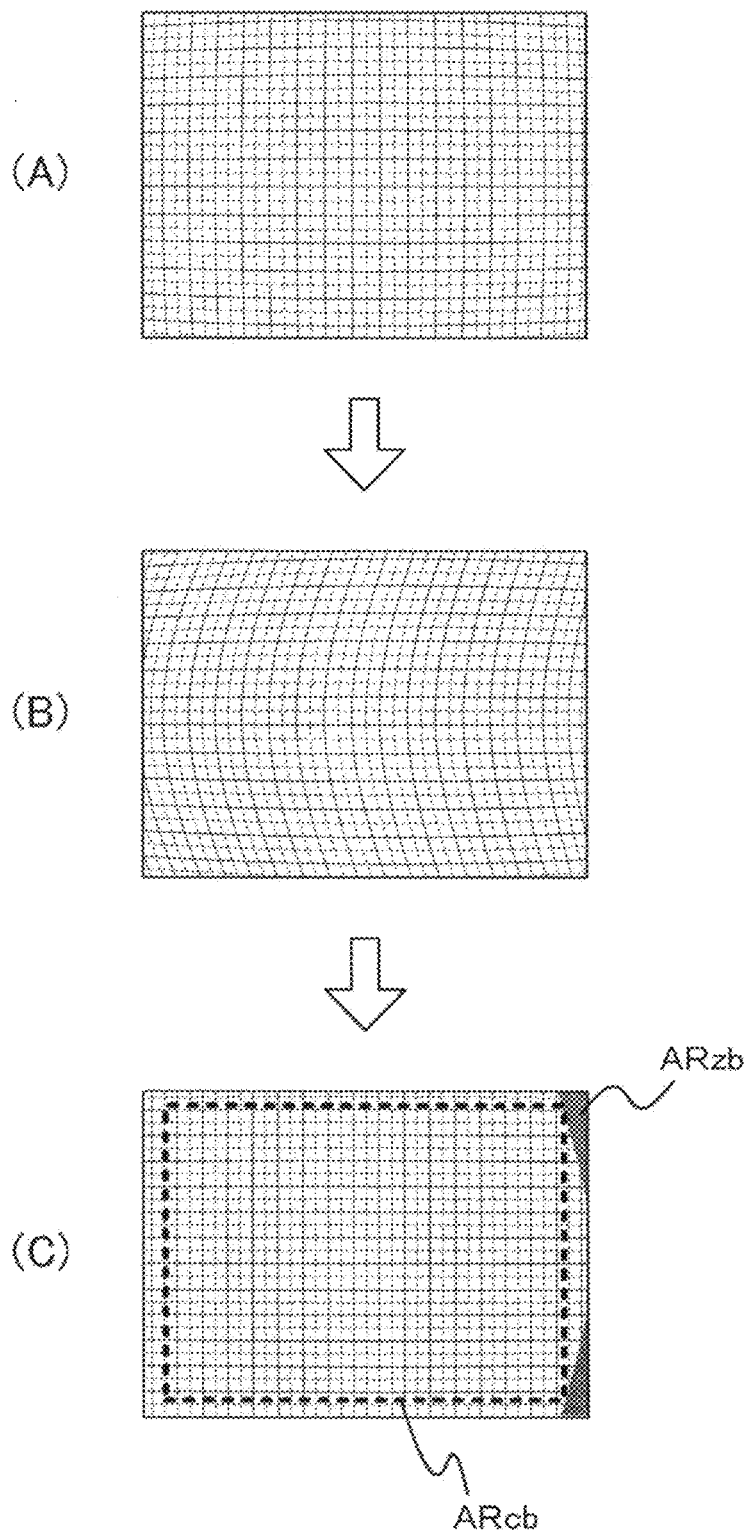
FIG. 10 is a drawing for describing the deflection corrected image generating operation in an embodiment.

Next, the deflection corrected image generating operation in the second embodiment will be described. FIG. 10 is a drawing for describing the deflection corrected image generating operation in the second embodiment. The captured image is illustrated in (A) of FIG. 10.

When the deflection in the yaw direction (left direction, for instance) is generated in the imaging device 10*b*, the distortion accompanying the movement of the shift lens of the deflection correction unit 113 and the posture change of the deflection correction unit 113 is generated in the captured image as indicated in (B) of FIG. 10.

When the distortion generated in the captured image is corrected in the distortion correction part 14*b* of the imaging device 10*b*, as indicated in (C) of FIG. 10, an area ARzb without an image is generated in the distortion corrected image. Thus, the distortion correction part 14*b* sets an image extraction area ARcb so as not to include the area without an image, extracts the image and outputs it as the image signal of the deflection corrected image.

Also, the distortion correction part 14*b* corrects the distortion on the basis of the distortion correction posture change amount obtained by performing a change amount converting operation indicated in FIG. 4. Thus, for the captured image after the distortion correction, since the distortion correction posture change amount is limited to the predetermined posture change amount even when the deflection correction posture change amount becomes large, the spread of the area without an image is also limited. Therefore, the reduction of the view angle of the image extracted in the distortion correction part 14*b* can be limited.

As described above, when generating the deflection corrected image so as not to include the area without an image, the reduction of the view angle of the deflection corrected image can be limited by limiting the distortion correction posture change amount in the second embodiment as well. Thus, the image quality degradation due to the enlargement of the image is reduced and the deflection corrected image with excellent image quality can be easily obtained. Also, by using the deflection correcting optical system, even when the optical system distortion is changed, the distortion can be corrected according to the change of the optical system distortion, and thus the deflection corrected image with little distortion can be obtained.

3. Third Embodiment

Then, in the third embodiment, the case of generating the deflection corrected image by moving the imaging element according to the deflection correction posture change amount will be described.

Figure 11:
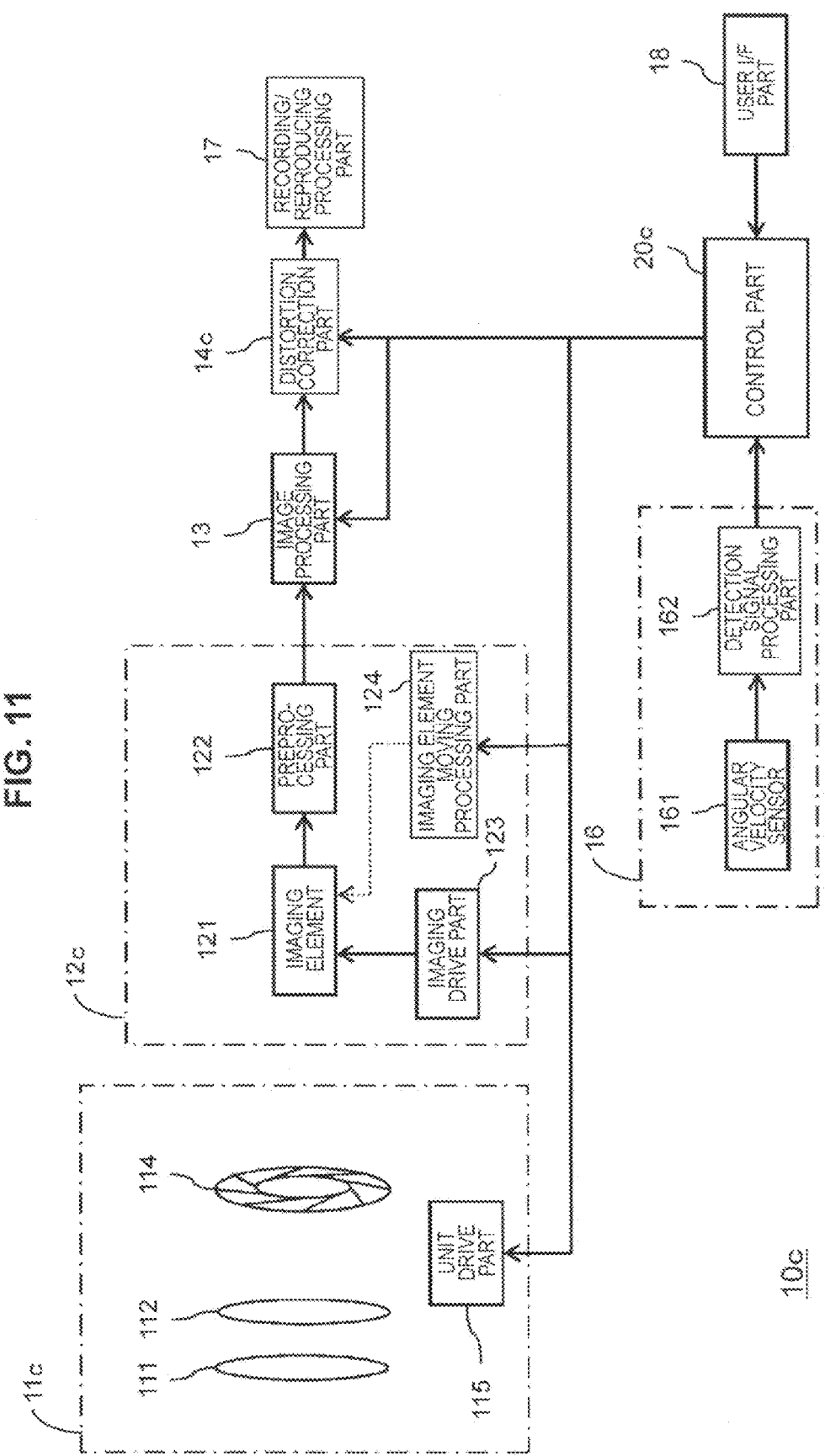
FIG. 11 is a drawing indicating a configuration of an embodiment.

FIG. 11 is a drawing indicating the configuration of the third embodiment of the imaging device of this technology. An imaging device 10*c* includes an imaging optical system 11*c*, an imaging part 12*c*, the image processing part 13, a distortion correction part 14*c*, and the posture change detection part 16. Further, the imaging device 10*c* includes the recording/reproducing processing part 17, the user interface (user I/F) part 18, and a control part 20*c*.

The imaging optical system 11*c* includes the zoom unit 111, the focus unit 112, the diaphragm unit 114, and the unit drive part 115 and the like.

The zoom unit 111 is configured using a zoom lens. The zoom unit 111 moves the zoom lens in the optical axis direction to vary the focus distance. That is, the zoom function is realized. The focus unit 112 is configured using a focus lens. The focus unit 112 moves the focus lens in the optical axis direction to adjust a focus. The diaphragm unit 114 is configured using an iris. The diaphragm unit 114 varies the opening amount of the iris to adjust the light quantity of the object optical image made incident on the imaging part 12. The unit drive part 115 drives the zoom unit 111, the focus unit 112, and the diaphragm unit 114, on the basis of the control signals from the control part 20*c*.

The imaging part 12*c* includes the imaging element 121, the preprocessing part 122, the imaging drive part 123, and an imaging element moving processing part 124 and the like. The imaging element 121 performs the photoelectric conversion processing, and converts the optical image formed on the imaging plane by the imaging optical system 11*c* to the electric signals. For the imaging element 121, for instance, a CCD (Charge Coupled Device) image sensor, or a CMOS (Complementary Metal-Oxide Semiconductor) image sensor or the like is used.

The preprocessing part 122 performs the noise elimination processing such as CDS (correlated double sampling) to the electric signals generated in the imaging element 121. Also, the preprocessing part 122 performs the gain adjustment to turn the signal level of the electric signals to the desired signal level. Further, the preprocessing part 122 performs the A/D conversion processing to convert the analog image signals that are the electric signals for which the noise elimination processing and the gain adjustment are performed to the digital image signals and to output them.

The imaging drive part 123 generates the operation pulses or the like that may be needed for driving the imaging element 121, on the basis of the control signals from the control part 20c. For instance, charge read pulses for reading charges, transfer pulses for performing transfer in the vertical direction and the horizontal direction, and shutter pulses for performing an electronic shutter operation and the like are generated.

The imaging element moving processing part 124 performs the deflection correction processing by moving the imaging element 121 on the basis of the deflection correction posture change amount indicated by the control signals from the control part 20c. That is, the imaging element moving processing part 124 moves the imaging element 121 on the basis of the deflection correction posture change amount such that the object that stands still even when the posture of the imaging device 10c is changed is at the fixed position on the screen, and makes the image signals of the image for which the deflection is corrected be outputted from the imaging part 12c.

The image processing part 13 performs the camera processing or the like to the digital image signals outputted from the imaging part 12c. The image processing part 13 performs the nonlinear processing such as the gamma correction and the knee correction, the color correction processing and the contour emphasis processing and the like to the image signals for instance.

The distortion correction part 14c performs the distortion correction on the basis of the control signals from the control part 20c to the image signals outputted from the image processing part 13. When the posture of the imaging device is changed by a camera shake or a vibration or the like and parallelism of a focus surface of an object and an imaging surface of the imaging element 121 is lost for instance, the trapezoidal distortion is generated in the captured image. Also, by the optical system distortion of the imaging optical system 11c, the distortion is generated in the captured image. The distortion correction part 14c corrects the distortion of the captured image generated by the posture change of the imaging optical system 11c and the distortion of the captured image generated by the optical system distortion of the imaging optical system 11c. Further, the distortion correction part 14c extracts the image signals of the image extraction area from the image for which the distortion correction is performed, and turns them to the image signals of the deflection corrected image.

The distortion correction part 14c has the distortion correction data table according to the posture change amount of the imaging device for instance beforehand, and selects the distortion correction data for the distortion correction posture change amount indicated by the control signals from the control part 20c. By using the distortion correction data, the coordinates of the respective pixels of the image signals including the distortion components are transformed to the coordinates after the correction, and the image signals of the image from which the distortion is removed or reduced are generated. In such a manner, when the distortion correction data table is used, the distortion can be corrected at a high speed and easily compared to the case of correcting the distortion by performing arithmetic processing.

The posture change detection part 16 detects the posture change in the pitch direction and the yaw direction of the imaging device 10c, and outputs the detection result to the control part 20c. The posture change detection part 16 includes the angular velocity sensor 161 and the detection signal processing part 162 for instance.

The angular velocity sensor 161 generates the detection signals according to the deflection in the pitch direction and the detection signals according to the posture change in the yaw direction, and outputs them to the detection signal processing part 162. The detection signal processing part 162 performs the noise elimination processing, the gain adjustment, the DC component elimination processing and the A/D conversion processing and the like to the detection signals, and outputs the detection signals after the processing to the control part 20c.

The recording/reproducing processing part 17 records the image signals outputted from the distortion correction part 14c to a recording medium, and also reads the image signals recorded in the recording medium and outputs them to the external device. The recording medium may be detachable like a memory card, an optical disk or a magnetic tape and may be a fixed type such as an HDD or a semiconductor memory module. Also, the recording/reproducing processing part 17 may be provided with an encoder and a decoder to perform compression encoding and expansion decoding of the image signals and record encoded signals in the recording medium.

The user interface part 18 includes the operation switch and the operation button and the like. The user interface part 18 generates the operation signals according to the user operation and outputs them to the control part 20c.

The control part 20c includes the CPU (Central Processing Unit), the ROM (Read Only Memory), and the RAM (Random Access Memory) for instance. The CPU reads and executes the control program stored in the ROM if needed. In the ROM, the program to be executed in the CPU as mentioned above and the data that may be in various kinds of processing and the like are stored beforehand. The RAM is a memory used as a so-called work area for tentatively storing the results in progress of the processing or the like. Also, in the ROM or the RAM, the information such as various kinds of setting parameters and the correction data and the like are stored.

The control part 20c controls the respective parts according to the operation signals from the user interface part 18 and the like and makes the operation according to the user operation be performed in the imaging device 10c. Also, the control part 20c controls the moving processing operation of the imaging element performed in the imaging element moving processing part 124 and the distortion correcting operation performed in the distortion correction part 14c. The control part 20c sets the deflection correction posture change amount on the basis of the detection signals outputted from the posture change detection part 16 and notifies the imaging element moving processing part 124. For instance, when the angular velocity sensor 161 is used in the posture change detection part 16, the control part 20c calculates the posture change amount (angle) by integrating the detection signals from the posture change detection part 16. Also, since the frequency of the posture change is not high in the posture change during hand-held photographing, the control part 20c performs the filter processing for making only the frequency components of a camera shake pass through to the detection signals. By performing such filter processing, the control part 20c accurately calculates the posture change amount according to the posture change of the imaging device body. The control part 20c outputs the calculated posture change amount to the imaging element moving processing part 124 as the deflection correction posture change amount. Also, the control part 20c performs the limiting processing in consideration of the difference between the view angles in the horizontal direction and the vertical direction to the calculated posture change amount (equivalent to the deflection correction posture change amount), and outputs the posture change amount after the limiting processing to the distortion correction part 14c as the distortion correction posture change amount.

Figure 12:
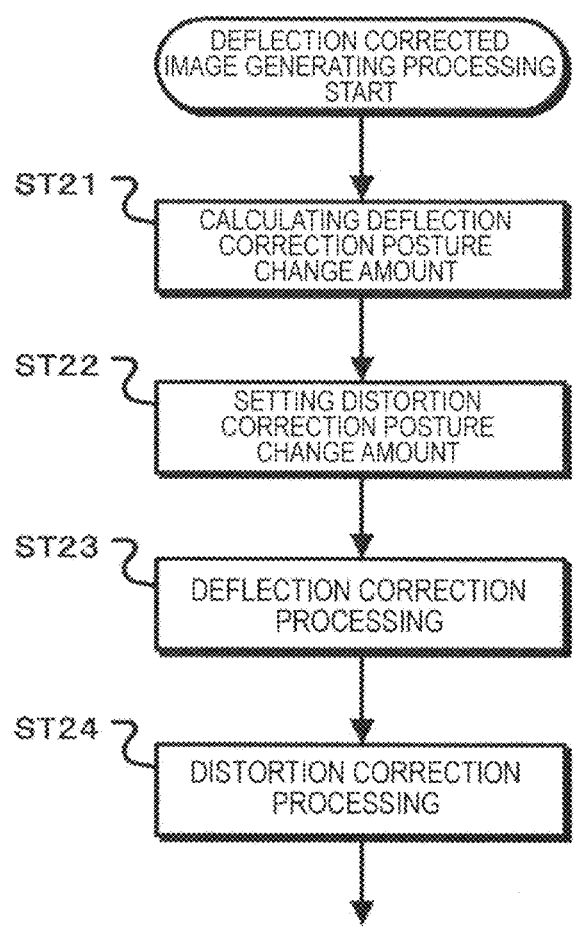
FIG. 12 is a flowchart indicating the deflection corrected image generating operation in an embodiment.

FIG. 12 is a flowchart indicating the deflection corrected image generating operation in the third embodiment. In step ST21, the imaging device 10c calculates the deflection correction posture change amount using the output of the posture change detection part 16 and advances to step ST22.

In step ST22, the imaging device 10c sets the distortion correction posture change amount. The imaging device 10c limits the posture change amount so as to suppress narrowing of the view angle when correcting the trapezoidal distortion, sets the posture change amount after the limiting processing as the distortion correction posture change amount, and advances to step ST23. For instance, the imaging device 10c imposes limitation to the deflection correction posture change amount and performs the conversion processing of converting it to the distortion correction posture change amount.

In step ST23, the imaging device 10c performs the deflection correction processing. The imaging device 10c corrects the deflection of the captured image by moving the imaging element 121 on the basis of the deflection correction posture change amount, generates the deflection corrected image, and advances to step ST24.

In step ST24, the imaging device 10c performs the distortion correction processing. The imaging device 10c corrects the distortion of the captured image on the basis of the distortion correction posture change amount. Also, the imaging device 10c generates the deflection corrected image by extracting the image of the image extraction area from the image for which the distortion correction is performed.

In such a manner, in the third embodiment, by correcting the deflection by moving the imaging element according to the deflection of the imaging device and correcting the distortion by limiting the distortion correction posture change amount as described above for the deflection corrected image, the reduction of the view angle of the deflection corrected image for which the distortion correction is performed can be limited, and the deflection corrected image with excellent image quality can be easily obtained.

Furthermore, the processing sequence that is explained in the specification can be implemented by hardware, by software and by a configuration that combines hardware and software. In a case where the processing is implemented by software, it is possible to install in memory within a computer that is incorporated into dedicated hardware a program in which the processing sequence is encoded and to execute the program. It is also possible to install a program in a general-purpose computer that is capable of performing various types of processing and to execute the program.

For example, the program can be recorded on a hard disk or ROM (Read Only Memory) as a recording medium in advance. Alternatively, the program can be temporarily or permanently stored (recorded) in (on) a removable recording medium such as a flexible disk, CD-ROM (Compact Disc Read Only Memory), MO (Magneto Optical) disk, DVD (Digital Versatile Disc), a magnetic disk, or a semiconductor memory card. Such a removable recording medium can be provided as so-called package software.

In addition, the program can be, not only installed on a computer from a removable recording medium, but also transferred wirelessly or by wire to the computer from a download site via a network such as a LAN (Local Area Network) or the Internet. In such a computer, a program transferred in the aforementioned manner can be received and installed on a recording medium such as built-in hardware.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An imaging device including:
a posture change detection part which detects a posture change of an imaging device body;
a deflection correction part which corrects deflection of a captured image generated by the posture change;
a distortion correction part which corrects distortion of the captured image generated by the posture change; and
a control part which makes the deflection be corrected in the deflection correction part based on the posture change detected in the posture change detection part, and makes the distortion be corrected in the distortion correction part based on posture change after limiting processing to the detected posture change.

(2) The imaging device according to (1),
wherein the control part limits the posture change detected in the posture change detection part to a range up to a predetermined regulated amount.

(3) The imaging device according to (2),
wherein the control part does not limit the posture change detected in the posture change detection part when the posture change is equal to or less than a first regulated amount below the predetermined regulated amount, the control part limits the posture change to the predetermined regulated amount when the posture change is equal to or more than a second regulated amount exceeding the predetermined regulated amount, and the control part limits the posture change to a value between the first regulated amount and the predetermined regulated amount when the posture change is in a range from the first regulated amount to the second regulated amount.

(4) The imaging device according to (2) or (3),
wherein the control part sets the regulated amount individually for the posture change for a longitudinal direction and the posture change for a lateral direction of the captured image, and limits the detected posture change.

(5) The imaging device according to any one of (2) to (4),
wherein the control part defines the predetermined regulated amount to be a maximum change amount of the posture change up to which the captured image of a desired image size for which the deflection correction and the distortion correction are performed does not include an area without an image generated by the distortion correction.

(6) The imaging device according to any one of (1) to (5),
wherein the distortion correction part corrects distortion in a trapezoidal shape generated by the posture change.

(7) The imaging device according to any one of (1) to (6),
wherein the distortion correction part corrects the distortion of the captured image based on an imaging optical system.

(8) The imaging device according to (7),
wherein the imaging optical system includes a deflection correcting optical system,
the deflection correction part corrects the deflection by driving the deflection correcting optical system, and the distortion correction part corrects the distortion of the captured image generated by the deflection correcting optical system.

In the imaging device, its control method and the program of this technology, the posture change of the imaging device body is detected, and the deflection of the captured image generated by the posture change is corrected on the basis of the detected posture change. Also, on the basis of the posture change after the limiting processing to the detected posture change, the distortion of the captured image generated by the posture change is corrected. Thus, the correction amount of the distortion correction to the posture change is limited, the area without the image, which appears in the image after the distortion correction, can be reduced, and narrowing of the view angle provided for a user can be limited. Since narrowing of the view angle provided for a user can be limited, the image quality degradation due to the enlargement of the image is reduced, and the deflection corrected image with the excellent image quality can be easily obtained. Thus, it is suitable for electronic equipment having an imaging function, such as a video camera, a digital camera and a portable terminal device.

The present disclosure contains subject matter related to that disclosed in Japanese Priority Patent Application JP 2012-127219 filed in the Japan Patent Office on Jun. 4, 2012, the entire content of which is hereby incorporated by reference.

What is claimed is:
1. An imaging device comprising:
a posture change detection part configured to detect posture change of an imaging device body; and
circuitry configured to:
correct deflection of a captured image based on the posture change; and
correct distortion of the captured image based on a limiting processed posture change generated by applying a limiting process to the posture change,
wherein the distortion being corrected is caused in a state where parallelism of focus surface of an object in the captured image and an imaging surface of the imaging device body is lost.

2. The imaging device according to claim 1, wherein the circuitry is configured to limit the posture change detected in the posture change detection part to a range up to a predetermined regulated amount.

3. The imaging device according to claim 2, wherein
the circuitry is configured not to limit the posture change detected in the posture change detection part in a state the posture change is equal to or less than a first regulated amount below the predetermined regulated amount,
the circuitry is configured to limit the posture to the predetermined regulated amount in a state the posture change is equal to or more than a second regulated amount exceeding the predetermined regulated amount, and
the circuitry is configured to limit the posture change to a value between the first regulated amount and the predetermined regulated amount in a state the posture change is in a range from the first regulated amount to the second regulated amount.

4. The imaging device according to claim 2, wherein the circuitry is configured to set the predetermined regulated amount individually for the posture change for a longitudinal direction and the posture change for a lateral direction of the captured image, and limit the detected posture change.

5. The imaging device according to claim 2, wherein the circuitry is configured to define the predetermined regulated amount to be a maximum change amount of the posture change up to which the captured image for which the deflection correction and the distortion correction are performed does not include an area without an image generate by the distortion correction.

6. The imaging device according to claim 1, wherein the circuitry is configured to correct distortion in a trapezoidal shape generated by the posture change.

7. The imaging device according to claim 1, wherein the circuitry is configured to corrected the distortion of the captured image based on distortion correction data stored in a correction data table according to a posture change amount of the imaging device body.

8. The imaging device according to claim 7, wherein coordinates of pixels of the captured image for which the distortion correction are to be performed are transformed to coordinates of pixels of the captured image after the corrected distortion, based on the correction data table.

9. A method of controlling an imaging device, the method comprising:
detecting, by a posture change detection part, a posture change of an imaging device body;
correcting, by circuitry of the imaging device, deflection of a captured image based on the posture change; and
correcting, by the circuitry, distortion of the captured image based on a limiting processed posture change generated by applying a limiting process to the posture change,
wherein the distortion being corrected is caused in a state where parallelism of a focus surface of an object in the captured image and an imaging surface of the imaging device body is lost.

10. The method according to claim 9, further comprising:
limiting the posture change detected in the posture change detection part to a range up to a predetermine regulated amount.

11. The method according to claim 10,
wherein the posture change detected in the posture change detection part is not limited in a state the posture change is equal to or less than a first regulated amount below the predetermined regulated amount,
the posture change is limited to the predetermined regulated amount in a state the posture change is equal to or more than a second regulated amount exceeding the predetermined regulated amount, and
the posture change is limited to a value between the first regulated amount and the predetermined regulated amount in a state the posture change is in a range from the first regulated amount to the second regulated amount.

12. The method according to claim 10, further comprising:
setting the predetermined regulated amount individually for the posture change for a longitudinal direction and the posture change for a lateral direction of the captured image, and limiting the detected posture change.

13. The method according to claim 10, further comprising:
defining the predetermined regulated amount to be a maximum change amount of the posture change up to which the captured image for which the deflection correction and the distortion correction are performed does not include an area without an image generated by the distortion correction.

14. The method according to claim 9, wherein the distortion in a trapezoidal shape generated by the posture change is corrected.

15. A non-transitory computer-readable medium storing a program for causing a computer to execute control on an imaging device, the program causing the computer to execute the steps of:
   correcting deflection of a captured image based on a posture change of an imaging device body; and
   correcting distortion of the captured image based on a limiting processed posture change generated by applying a limiting process to the posture change of the imaging device body,
   wherein the distortion being corrected is caused in a state where parallelism of a focus surface of an object in the captured image and an imaging surface of the imaging device body is lost.

* * * * *